US009626495B2

(12) United States Patent
Deffeyes et al.

(10) Patent No.: US 9,626,495 B2
(45) Date of Patent: Apr. 18, 2017

(54) AUTHENTICATING A DEVICE BASED ON AVAILABILITY OF OTHER AUTHENTICATION METHODS

(71) Applicant: International Business Machines Corporation, Armonk, NY (US)

(72) Inventors: Suzanne C. Deffeyes, Weaverville, NC (US); Francis J. Hildenbrand, Jr., Wappingers Falls, NY (US); Garreth J. Jeremiah, Ontario (CA); Amir Khan, Brookfield, CT (US); C. Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 14/542,706

(22) Filed: Nov. 17, 2014

(65) Prior Publication Data

US 2016/0142405 A1    May 19, 2016

(51) Int. Cl.
*G06F 21/32* (2013.01)
*H04L 29/06* (2006.01)
(Continued)

(52) U.S. Cl.
CPC .............. *G06F 21/32* (2013.01); *G06F 21/31* (2013.01); *G06F 21/316* (2013.01);
(Continued)

(58) Field of Classification Search
CPC ......... G06F 21/31; G06F 21/316; G06F 21/32
See application file for complete search history.

(56) References Cited

U.S. PATENT DOCUMENTS 6,895,514 B1 * 5/2005 Kermani ............... G06F 21/316
726/19
8,284,933 B2   10/2012 Chaisson et al.
(Continued)

FOREIGN PATENT DOCUMENTS

EP      0196880 A2    10/1986
WO   2004061818 A2    7/2004
WO   2004075097 A1    9/2004

OTHER PUBLICATIONS

Advanced user authentication for mobile devices; N.L. Clarke et al.; computers & security 26; pp. 109-119; 2007.*
(Continued)

*Primary Examiner* — James Turchen
(74) *Attorney, Agent, or Firm* — Arnold Bangali

(57) ABSTRACT

An approach for authenticating a device is provided. The approach includes a computer implemented method for receiving a first stage biometric variable verification data for accessing the device. The approach further includes a computer-implemented method for computing a second stage binary authentication data for accessing the device. The approach further includes analyzing the received first stage biometric variable verification data and the second stage binary authentication data. The approach further includes receiving the second binary authentication data for accessing the device. The approach further includes generating a confidence score level using the analyzed first stage biometric variable verification data and second stage binary authentication data, wherein, if the first stage biometric variable verification data is verified as having a sufficient confidence level score, then a required password entry, for the second stage binary authentication data requires less than all the normal number of characters for accessing the device.

20 Claims, 5 Drawing Sheets

(51) Int. Cl.
*G06K 9/00* (2006.01)
*G06F 21/31* (2013.01)

(52) U.S. Cl.
CPC ..... *G06K 9/00087* (2013.01); *G06K 9/00288* (2013.01); *H04L 63/083* (2013.01); *H04L 63/0861* (2013.01); *H04L 2463/082* (2013.01)

(56) References Cited

U.S. PATENT DOCUMENTS

| | | | |
|---|---|---|---|
| 2002/0042882 A1 | 4/2002 | Dervan et al. | |
| 2006/0041756 A1* | 2/2006 | Ashok | G06F 21/31 713/183 |
| 2006/0210119 A1* | 9/2006 | Willis | G06K 9/00892 382/115 |
| 2007/0241861 A1* | 10/2007 | Venkatanna | G06F 21/32 340/5.52 |
| 2008/0066167 A1* | 3/2008 | Andri | G06F 21/46 726/5 |
| 2008/0209226 A1* | 8/2008 | Venkatesan | H04L 9/3231 713/186 |
| 2009/0116703 A1* | 5/2009 | Schultz | G06F 21/32 382/118 |
| 2009/0187962 A1* | 7/2009 | Brenneman | G06F 21/316 726/1 |
| 2012/0167170 A1* | 6/2012 | Shi | G06F 21/32 726/2 |
| 2012/0201381 A1* | 8/2012 | Miller | H04L 9/16 380/255 |
| 2013/0067547 A1 | 3/2013 | Thavasi et al. | |
| 2013/0174241 A1* | 7/2013 | Cha | H04L 63/0815 726/7 |
| 2013/0198832 A1* | 8/2013 | Draluk | G06F 21/31 726/16 |
| 2013/0239206 A1* | 9/2013 | Draluk | G06F 21/00 726/19 |
| 2013/0262873 A1* | 10/2013 | Read | H04W 12/06 713/186 |
| 2014/0129974 A1* | 5/2014 | Ben-Harrush | G06F 3/0484 715/781 |
| 2014/0165169 A1* | 6/2014 | Buck | G06F 21/31 726/7 |
| 2014/0282868 A1* | 9/2014 | Sheller | G06F 21/31 726/3 |
| 2015/0040193 A1* | 2/2015 | Clemons | G06F 21/40 726/4 |
| 2016/0065570 A1* | 3/2016 | Spencer, III | G06Q 20/40 726/7 |

OTHER PUBLICATIONS

Mayrhofer et al., "Shake Well Before Use: Authentication Based on Accelerometer Data", Pervasive 2007, LNCS 4480, pp. 144-161,2007, © Springer-Verlag Berlin Heidelberg 2007.

* cited by examiner

AUTHENTICATING A DEVICE BASED ON AVAILABILITY OF OTHER AUTHENTICATION METHODS

TECHNICAL FIELD

The present invention generally relates to computing devices, and more particularly to selection of a reduced number of password characters required, which is a subset of the total number of password characters required, for authenticating computing devices, based on availability of other authentication methods of the computing devices.

BACKGROUND

Authentication is a process by which a system verifies the identity of a systems administrator, or user, who wishes to access the system. The authentication process may include determination of whether user, e.g., a systems administrator is in fact, who, or what it is declared to be. For instance, the authentication may be implemented using credentials, which is can be composed of a User ID and Password of the systems administrator. Authentication may also be implemented with Smart Cards, an Authentication Server, or even a Public Key Infrastructure or other methods. In private and public computer networks, such as, the Internet, authentication is commonly performed through the use of logon passwords. In general, knowledge of the password is assumed to guarantee that the user is authenticated. Users initially register for authentication of the system, or are registered by someone else, using an assigned or self-declared password. Further, on each subsequent use of the system, the user must know and use the previously declared password for accessing the system.

SUMMARY

According to one embodiment, a computer-implemented method for authenticating a device is provided. The computer-implemented method includes receiving a first stage biometric variable verification data for accessing the device, the received first stage biometric variable verification data is detected by biometric sensors of the device. The computer-implemented method further includes computing a second stage binary authentication data for accessing the device, based on the received first stage biometric variable verification data, the second stage binary verification data is based on passwords, or pass-pins, for accessing the device. The computer-implemented method further includes analyzing the received first stage biometric variable verification data and the second stage binary authentication data, to determine whether the second stage binary authentication data and first stage biometric variable verification data, is associated with a client or a system of the device. The computer-implemented method further includes receiving the second binary authentication data for accessing the device. The computer-implemented method further includes generating a confidence score level using the analyzed first stage biometric variable verification data and second stage binary authentication data, if the client or the system is associated with the first stage biometric variable verification data, wherein, if the first stage biometric variable verification data is verified as having a sufficient confidence level score, then a required password entry, for the second stage binary authentication data requires less than all the normal number of characters for accessing the device, wherein the required password entry is interchangeable or varies, based on the generated confidence score level.

According to another embodiment, a computer system for authenticating a device is provided. The computer system includes one or more processors, one or more computer-readable memories, one or more computer-readable tangible storage devices and program instructions which are stored on at least one of the one or more storage devices for execution by at least one of the one or more processors via at least one of the one or more memories. The computer system further includes program instructions to receive a first stage biometric variable verification data for accessing the device, the received first stage biometric variable verification data is detected by biometric sensors of the device. The computer system further includes program instructions to compute a second stage binary authentication data for accessing the device, based on the received first stage biometric variable verification data, the second stage binary verification data is based on passwords, or pass-pins, for accessing the device. The computer system further includes program instructions to analyze the received first stage biometric variable verification data and the second stage binary authentication data, to determine whether the second stage binary authentication data and first stage biometric variable verification data, is associated with a client or a system of the device. The computer system further includes program instructions receive the second binary authentication data for accessing the device. The computer system further includes program instructions to generate a confidence score level using the analyzed first stage biometric variable verification data and second stage binary authentication data, if the client or the system is associated with the first stage biometric variable verification data, wherein, if the first stage biometric variable verification data is verified as having a sufficient confidence level score, then a required password entry, for the second stage binary authentication data requires less than all the normal number of characters for accessing the device, wherein the required password entry is interchangeable or varies, based on the generated confidence score level.

In yet another embodiment, computer program product for authenticating a device is provided. The computer program product includes one or more computer-readable tangible storage devices and program instructions stored on at least one of the one or more storage devices. The computer program product further includes program instructions to receive a first stage biometric variable verification data for accessing the device, the received first stage biometric variable verification data is detected by biometric sensors of the device. The computer program product further includes program instructions to compute a second stage binary authentication data for accessing the device, based on the received first stage biometric variable verification data, the second stage binary verification data is based on passwords, or pass-pins, for accessing the device. The computer program product further includes program instructions to analyze the received first stage biometric variable verification data and the second stage binary authentication data, to determine whether the second stage binary authentication data and first stage biometric variable verification data, is associated with a client or a system of the device. The computer program product further includes program instructions receive the second binary authentication data for accessing the device. The computer program product further includes program instructions to generate a confidence score level using the analyzed first stage biometric variable verification data and second stage binary authentication data, if the client or the system is associated with the first stage biometric variable verification data, wherein, if the first stage biometric variable verification data is verified as having a sufficient confidence level score, then a required password entry, for the second stage binary authentication data requires less than all the normal number of characters for accessing the device, wherein the required password entry is interchangeable or varies, based on the generated confidence score level.

In yet another embodiment, a method for deploying a system for authenticating a device is provided, the method comprising: providing a computer infrastructure being operable to: receive, in a computer memory medium, a first stage biometric variable verification data for accessing the device, the received first stage biometric variable verification data is detected by biometric sensors of the device; compute a second stage binary authentication data for accessing the device, based on the received first stage biometric variable verification data; analyze the received first stage biometric variable verification data and the second stage binary authentication data, to determine whether the second stage binary authentication data and first stage biometric variable verification data, is associated with a client or a system of the device; receive the second binary authentication data for accessing the device; and generate a confidence score level using the analyzed first stage biometric variable verification data and second stage binary authentication data, if the client or the system is associated with the first stage biometric variable verification data, wherein, if the first stage biometric variable verification data is verified as having a sufficient confidence level score, then a required password entry, for the second stage binary authentication data requires less than all the normal number of characters for accessing the device, wherein the required password entry is interchangeable or varies, based on the generated confidence score level.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
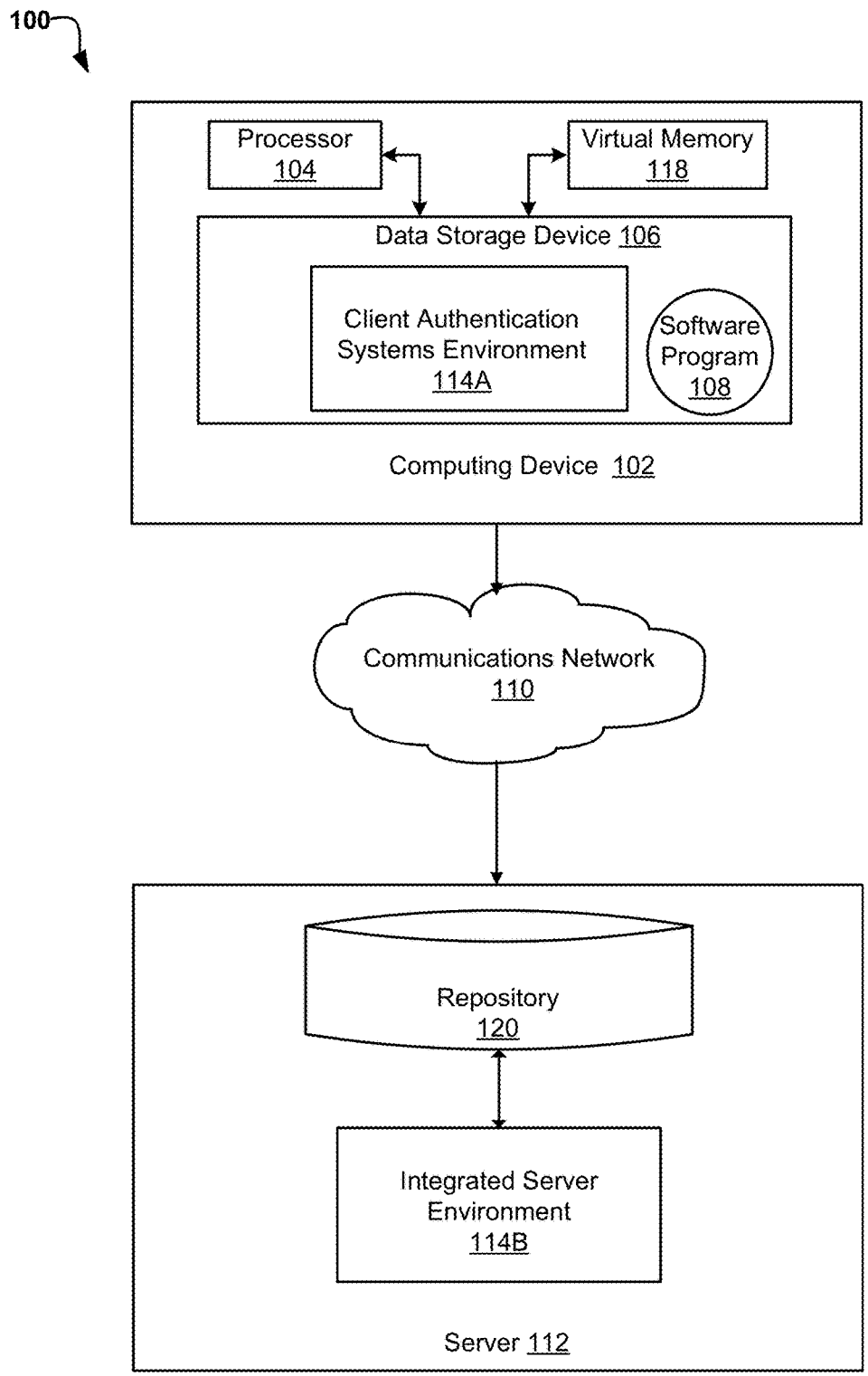
FIG. 1 illustrates a networked computer environment according to one embodiment.

Detailed embodiments of the claimed structures and methods are disclosed herein; however, it may be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Most devices contain authentication methods, which are adapted to permit, allow or disallow access to devices. Such devices typically require passwords, pins or pass-phrases, for authenticating access to the device. These types of authentication methods are generally known as binary authentication methods.

Alternatively, some devices contain a variety of authentication capabilities, which are adapted to return a likelihood response or confidence level for authenticating access of a client or a system to the device. For example, these authentication methods may include, for instance, fingerprints, hand prints, typing characteristics, iris scan, voice recondition, for verifying the authentication to the devices. Also, for example, these authentication methods do not return a yes/no, permit/dis-permit, or allow/disallow response, for authenticating access to the devices, but rather return a likelihood response, for authenticating access to the devices, whereby, the authentication is often expressed as a percent of certainty, for accessing the device. These types of authentication methods are generally known as variable authentication methods.

The present invention generally relates to computing devices, and more specifically to selection of password characters for authenticating computing devices, based on availability of other authentication methods for accessing the computing devices. The embodiments include one or more circuits, or subassemblies of circuits, as well as, a system, or computer-implemented methods of operation for authenticating the computing devices, whereby, for example, when variable authentication methods are used to authentication access to the computing device, the number of characters required from binary authentication methods, for authenticating the computing device, such as, password or pin or pass phrase, may be dynamically reduced, based on generated confidence level of detected stage biometric verification data, of a client, or a system of the device, according to embodiments.

For example, according to embodiments, first, a system of the present invention receives the biometric verification data of the variable authentication methods for authenticating the access to the computing device. Next, the system computes an amount password, pass-pins, or pass phrase, of the binary authentication methods for authenticating the access, based on the received variable authentication methods. Thereafter, next, the password or pin or pass phrase, of the binary authentication methods, may be dynamically reduced, based on the generated confidence level of detected biometric verification data, of a client, or a system, as described in further details below, according to embodiments.

In another example, consider a scenario, whereby the computing device requires a password of eight characters to authenticate a client, or a system for accessing the computing device. Also, consider that the computing device contains fingerprint reader. However, the computing device is locked, and typically requires the eight character password to unlock the device. In this case, user of the system uses the fingerprint reader of the computing device which determines the likelihood or confidence level that the user is the authorized user of the system is 92%. In this case, at least one embodiment of the present invention provides authentication to the computing device, whereby, when variable authentication methods are used, such as, the fingerprint reader, the number of characters required from binary authentication methods, for authenticating the device, such as, password or pin or pass phrase, may be dynamically reduced, based on generated confidence level of the detected fingerprint.

In another embodiment, the invention provides a method that performs the process of the invention on a subscription, advertising, and/or fee basis. That is, a service provider, such as a Solution Integrator, could offer to provide functionality for computing based authentication of device. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for authenticating of devices. In this case, a computer infrastructure, such as a authentication system environment 100 (FIG. 1), can be provided and one or more systems for performing the processes of the invention can be obtained (e.g., created, purchased, used, modified, etc.) and deployed to the computer infrastructure.

To this extent, the deployment of a system can comprise one or more of: (1) installing program code on a computing device, such as the authentication system environment 100 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The computing device can be a standalone computing device, or a mobile device, of the client, or the system. The detected second stage biometric verification data comprises a plurality biometric verification techniques, comprising at least one or more of a finger press strength techniques, voice recognition techniques, face recognition techniques, or hand print techniques of the client or device. For example, the computing device may include an authentication function for authenticating the client of the device The computing device may also include a resource monitoring function, which correlates with the authentication function to inform the use that the user is authenticated to access the device. Subsequently, the resource monitoring function communications to other parts of the computing device that the user is authenticated, according to embodiments.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The embodiments will now be described in detail with reference to the accompanying Figures. Referring to FIG. 1, authentication system environment 100, for authenticating a device, based on availability of other authentication methods for authenticating the device, whereby, when variable authentication methods are used, the number of characters required from a binary authentication methods, for authenticating the device, such as, password or pin or pass phrase, may be dynamically reduced, based on generated confidence level of detected stage biometric verification data, of a client, or a system of the device, all within authentication system environment 100, is depicted, according to embodiments.

It should be appreciated that FIG. 1 provides only an illustration of one implementation and does not imply any limitations with regard to the environments in which different embodiments may be implemented. Many modifications to the depicted environments may be made based on design and implementation requirements. For example, the authentication system environment 100 may also include a plurality of computing device 102 and server 112, for authenticating a device, based on availability of other authentication methods for authenticating the device, within the integrated authentication system environment 100, only one of which is shown, at least in FIG. 1. computing device 102 can be a desktop computing device, or any portable device that provides computing, information storage and, computing retrieval capabilities or any other computing device for authenticating a device, based on availability of other authentication methods for authenticating the computing device 102.

For example, in the illustrated environment, the authentication system environment 100 may include a computing device 102 with a processor 104, a data database storage 106, and a virtual memory 118 which is enabled to run, or execute program instructions of a software program 108. The computing device 102 may include a client authentication systems environment 114A, for providing an interface for authenticating a client or a system of computing device 102, based on availability of other authentication methods for authenticating the device.

The authentication system environment 100 may also include a server 112, running an integrated server environment 114B, and interconnected with computing device 102, over communications network 110, for providing a virtualized framework for displaying authentication characteristics, such as, for instance, graphical displays, of programs or modules, of a binary authentication method or a variable authentication method for authenticating the client or the system of computing device 102, based on availability of other authentication methods. The integrated server environment 114B may also enable the delivery and operation of secure, personalized authentication applications to the computing device 102, for displaying the authentication characteristics, of the binary authentication method, or the variable authentication method for authenticating the client or the system of the computing device 102.

The virtual memory 118 may comprise, for example, one or more computer-readable storage media, which may include random-access memory (RAM) such as various forms of dynamic RAM (DRAM), e.g., DDR2 SDRAM, or static RAM (SRAM), flash memory, or any other form of fixed or removable mobile computing storage medium that may be used to carry or store desired program code and program data in the form of instructions or data structures and that may be accessed by other components of computing device 102, for ensuring adequate, or precise display of the authentication characteristics, of the binary authentication methods, or the variable authentication method, or information, for authenticating computing device 102.

The communications network 110 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The computing device 102 may communicate with the integrated server environment 114B, running on server 112, via the communication network 110, for providing a virtualized framework for authenticating a client or a system of computing device 102, based on availability of other authentication methods for authenticating the computing device 102, based on generated confidence levels of detected stage biometric verification data, of a client, or a system, of the computing device 102. The communications network 110 may also include connections, such as wire, wireless communication links, or fiber optic cables. As will be discussed with reference to FIG. 5, server 112 may include internal components 800a and external components 900a, respectively, and computer 102 may include internal components 800b and external components 900b, respectively. The computing device 102 may be any portable device that provides computing, information storage and, computing retrieval capabilities, including, for example, a handheld device, or handheld computer, pocket PC, connected organizer, electronic book (eBook) reader, a personal digital assistant (PDA), a smart phone, or other portable devices, or any type of computing devices capable of accessing a network for providing a virtualized framework for authenticating a client or a system of computing device 102, based on availability of other authentication methods for authenticating the computing device 102. The computing device 102 may also be laptop, tablet, or notebook personal computer (PC), a desktop computer, a mainframe or mini computer, or a personal digital assistant (PDA).

The data storage device 106 of the computing device 102 is any type of storage device, storage server, storage area network, redundant array of independent discs (RAID), cloud storage service, or any type of data storage. The data storage device 106 may also be a relational model database server for storing program instructions of passwords of a client's or a system's authenticating credentials, for authenticating the client or the system of the computing device 102, based on variable authentication methods and binary authentication methods, for authenticating the client or the system, whereby, the client or system credentials, which may be stored in the data storage device 106, may include, a plurality of passwords, pass pins, or pass phrases of the binary authentication method, according to embodiments.

The server 112 may be, for example, a server computer system such as a management server, a web server, or any other electronic device or computing system that acts as an intersection for providing authenticating parameters, or authenticating features for authenticating the client or the system, of computing device 102, based on variable authentication methods and binary authentication methods, whereby, the server 112 is capable of receiving and sending data, such as, precise authenticating program analysis, or storage of information, of the authenticating program analysis, for authenticating the client or the system of computing device 102. The server 112 may also represent a "cloud" of computers interconnected by one or more networks, whereby server 112 may be a primary server for a computing system utilizing clustered computers when accessed through communications network 102. For example, a cloud computing system may be an implementation of a virtualized system for precise authenticating program analysis, or storage of information of the authenticating program analysis, for authenticating the client or the system of computing device 102. The repository 120 is any type of storage device, storage server, storage area network, redundant array of independent discs (RAID), cloud storage service, or any type of data storage for storing information relating to the precise authenticating program analysis, for authenticating the client or the system of computing device 102, according to embodiments.

According to embodiments, the client authentication systems environment 114A, of the computing device, may be a web browser plug-in system application program that provides an administrative user-interface, for authenticating a client or a system, for accessing the computing device 102, whereby, when variable authentication methods are used, the number of characters required from a binary authentication methods, for authenticating the computing device 102, such as, password or pin or pass phrase, may be dynamically reduced, based on generated confidence level of detected stage biometric verification data, of a client, or a system of the device. The computing interface also provides a system application functions for configuring passwords, pass-codes, pass-pins, or pass-phrases, of the client or the system, based on the binary authentication methods. For example, the interface can also be used to detect variable authenticating features of detected biometric verification data, of the client or the system, of the variable authentication methods, whereby the biometric verification data includes a plurality biometric verification techniques, such as, finger press strength, voice recognition, face recognition or hand print techniques of the client or the system.

For instance, the biometric verification data may be monitored, periodically, randomly, and/or using event-based monitoring, by the client authentication systems environment 114A, to identify authenticated clients or systems for accessing the computing device 102, in an event when variable authentication methods are used to access the computing device 102, whereby, if the variable authentication methods are used to access the computing device 102, the number of characters required from a binary authentication methods, for authenticating the device, such as, password or pin or pass phrase, may be dynamically reduced, based on generated confidence level.

Also, the client authentication systems environment 114A may access the integrated server environment 114B, running on server 112, for authenticating the client or the system, for accessing the computing device 102. The client authentication systems environment 114A may be centralized on the server 112, or it may also it may be divided between two different components: server-side and client-side. The integrated server environment 114B, running on server 112 may interact with the web browser of the client authentication systems environment 114A, for transmission of the client, or the system credentials for authenticating the client, or the system, for accessing the computing device 102, according to at least one embodiment.

The client authentication systems environment 114A executes programs, or applications in an operating system (OS), for displaying the authenticating characteristic, for authenticating the client, or the system, for accessing the computing device 102. As previously described, the computing device 102 may include an authentication function for authenticating the client of the computing device, whereby the authentication function is operated by an operating system (OS). The computing device may also include a resource monitoring function, which correlates with the authentication function of the OS to inform the use that the user is authenticated to access the device. Subsequently, the resource monitoring function communications to other parts of the computing device that the user is authenticated.

For example, the OS utilizes data or information of an external source, or of the user, and generates the authenticating characteristics, of the binary authentication method, or the variable authentication method, as graphical output displays, in the OS. The OS may be Android® (Android and all Android-based trademarks and logos are trademarks or registered trademarks of Google, Inc. and/or its affiliates) or Blackberry® OS (Blackberry and all Blackberry-based trademarks and logos are trademarks or registered trademarks of Blackberry, Inc. and/or its affiliates).

The OS may also include an authentication application, which may retrieve information, or data either from the user, or from some external source, for monitoring and/or detecting variable authenticating features of detected biometric verification data, of the client or the system, of the variable authentication methods, whereby the biometric verification data includes a plurality biometric verification techniques, such as, finger press strength, voice recognition, face recognition or hand print techniques of the client or the system, which are monitored, or detected within the authentication application, for providing access to the computing device.

The authentication application of the OS, may also be adaptable to receive input of binary authentication inputs of pass-words, pass-pins, or passphrases of the client or the system, for accessing the computing device 102. The authentication application may also include a binary authentication input program and variable authentication input program, for authenticating the computing device. The binary authentication input program may receive configured inputs of passwords, or pass-pins, of the system, or the client of the computing device, whereby, if the binary authentication method is successful, the client or the system is provided access to the computing device. The variable authentication input program may contain a variety of authentication capabilities for authenticating the client, or the system, for accessing the computing device. The variable authentication input program may be adaptive to receive variable authentications, such as biometric data of the client, or the system, for accessing the computing device 102, whereby, the received biometric verification data is detected and authenticated, by biometric sensors of the computing device, based on recognition features of the client or the system, such as, fingerprints, handprints, or voice recognition characteristics, for accessing the computing device 102.

A client variable confidence analytic program of the authentication application, may generate an authentication confidence score level, for accessing the computing device 102, based on analyzed variable authentication data of the variable authentication input program, if the client, or the system is associated with the biometric verification data, for accessing the computing device. If the biometric verification data is verified as having a sufficient confidence level score, then a required password entry, for the binary authentication input program requires less than all the normal number of characters of the binary authentication input program, for accessing the computing device 102.

The generated score level is compiled for each one of the plurality biometric verification techniques, such as, monitored or detected finger press strength techniques, voice recognition techniques, face recognition techniques, or hand print techniques of the client or the system of the variable authentication input program. Also, if the biometric verification data of the variable authentication input program is verified as having a sufficient confidence level score, then authenticating features of the computing device 102, overlooks potential errors, in entry of a plurality of characters of passwords, or pass-pins, of the received binary authentication input program, for authenticating the computing device 102, according to embodiments.

Figure 2:
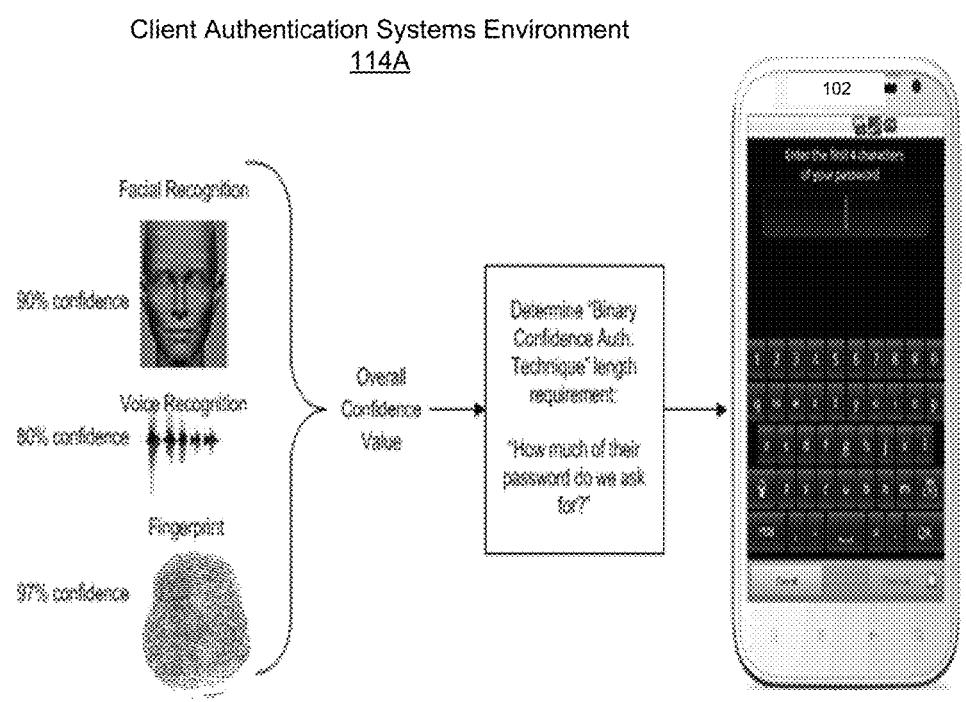
FIG. 2 is a diagram depicting an illustrative example for authenticating a computing device, according to at least one embodiment.

Referring now to FIG. 2, a diagram 200, depicting an illustrative example for authenticating the computing device 102, based on availability of other authentication methods for authenticating the computing device 102, whereby, when variable authentication methods are used, the number of characters required from a binary authentication methods, for authenticating the computing device 102, such as, password or pin or pass phrase, may be dynamically reduced, based on generated confidence level of detected stage biometric verification data, of a client, or a system of the computing device 102, according to embodiments.

For example, in the depicted illustration, the client's or system's variable authentication input, is monitored and detected by client authentication systems environment (FIG. 1), to generate an authentication confidence score level, for accessing the computing device 102 (FIG. 1), based on analyzed variable authentication data of the a variable authentication input program of the client authentication systems environment (FIG. 1), if the client, or the system is associated with the biometric verification data, for accessing the computing device 102 (FIG. 1).

For example, the variable authentication input program determines that there the client or the system are whom they claim to be, based on a highly generated authentication score level, for authenticating the client or the system, for accessing the computing device 102.

For instance, as depicted, there is a 90% confidence score level that facial features of the client or system are verified to be that of the client or the system. There is also a 80% confidence score level that voice features of the client or the system are varied to be that of the client or the system, and finally, there is a 97% confidence score level that fingerprint of the client or the system are varied to be that of the client or the system. Therefore, according to embodiments, since the biometric verification data of facial recognition, voice recognition, and fingerprint recognition, are verified as having a sufficient confidence level scores for authenticating the client or the system, for accessing the computing device 102, then, the client authentication systems environment (FIG. 1), determines that the required password entry requires less than all the normal number of characters of a binary authentication input program of the client authentication systems environment (FIG. 1), for accessing the computing device 102 (FIG. 1), according to embodiments.

According to embodiments, selection of how many characters are required for authentication can be variable dependent on the degree of confidence of the monitored or detected biometric verification data, for authenticating the client or the system. For example, the binary authentication input program may combine different confidence scores to produce an aggregate score that is then used to select the number of characters to required for authentication. For example, if average confidence of facial and finger >80% then require 6 of 8 characters.

Figure 3:
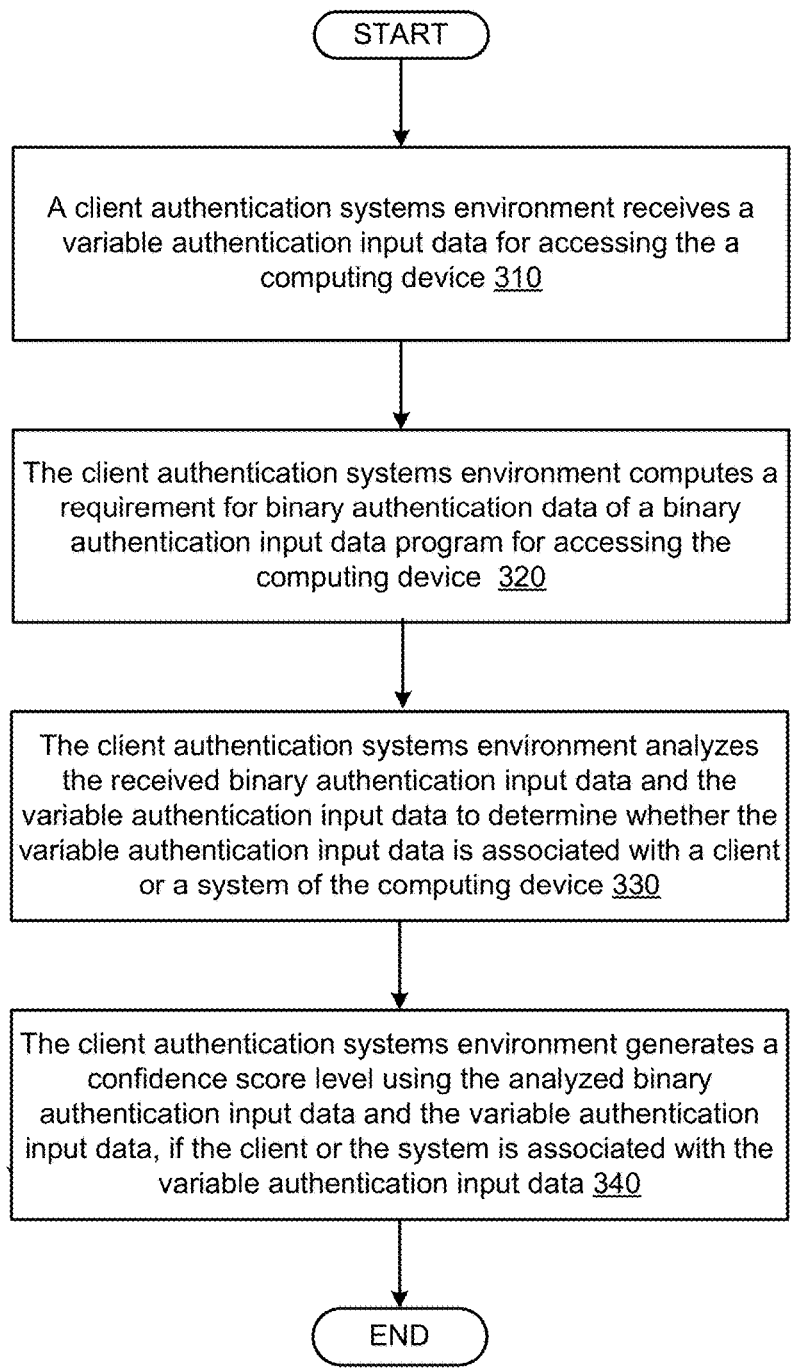
FIG. 3 is an operational flowchart illustrating the steps carried out by a program for authenticating access of a computing device, based on availability of other authentication methods for authenticating the device, according to embodiments.

Referring now to FIG. 3, an operational flowchart 300 illustrating steps carried out by a program for authenticating access to computing device 102 (FIG. 1), based on availability of other authentication methods for authenticating the device, whereby, when a variable authentication methods are used, the number of characters required from a binary authentication methods, for authenticating the computing device 102, may be dynamically reduced, based on generated confidence level of detected stage biometric verification data, of a client, or a system of the computing device 102, according to embodiment.

At 310, the client authentication systems environment 114A (FIG. 1) receives biometric variable verification data for accessing the computing device 102 (FIG. 1). For example, wherein the biometric variable verification data comprises a plurality biometric verification techniques, comprising at least one or more of a finger press strength techniques, voice recognition techniques, face recognition techniques, or hand print techniques, which are detected, for authenticating access to the computing device 102, according to embodiments. At step 320, client authentication systems environment 114A computes a requirement for binary authentication data of a binary authentication input data program for accessing the computing device 102 (FIG. 1). The binary authentication data is based on passwords, or pass-pins, for accessing the computing device 102 (FIG. 1). At step 330, the client authentication systems environment 114A analyzes the received binary authentication data and the received biometric variable verification data, to determine whether the binary authentication data is associated with a client, or a system of the computing device 102. At step 340, the client authentication system environment 114A generates a confidence score level using the analyzed binary authentication data and the biometric variable verification data, if the client or the system is associated with the biometric variable verification data, wherein, if the biometric variable verification data is verified as having a sufficient confidence level score, then a required password entry, for the binary authentication data of a binary authentication input data program of the client authentication system environment 114A (FIG. 1), requires less than all the normal number of characters for accessing the computing device 102. Further, if the biometric variable verification data is verified as having a sufficient confidence level score, the computing device 102 (FIG. 1) overlooks an error in entry of a plurality of characters of passwords, or pass-pins, of the received binary authentication data.

Figure 4:
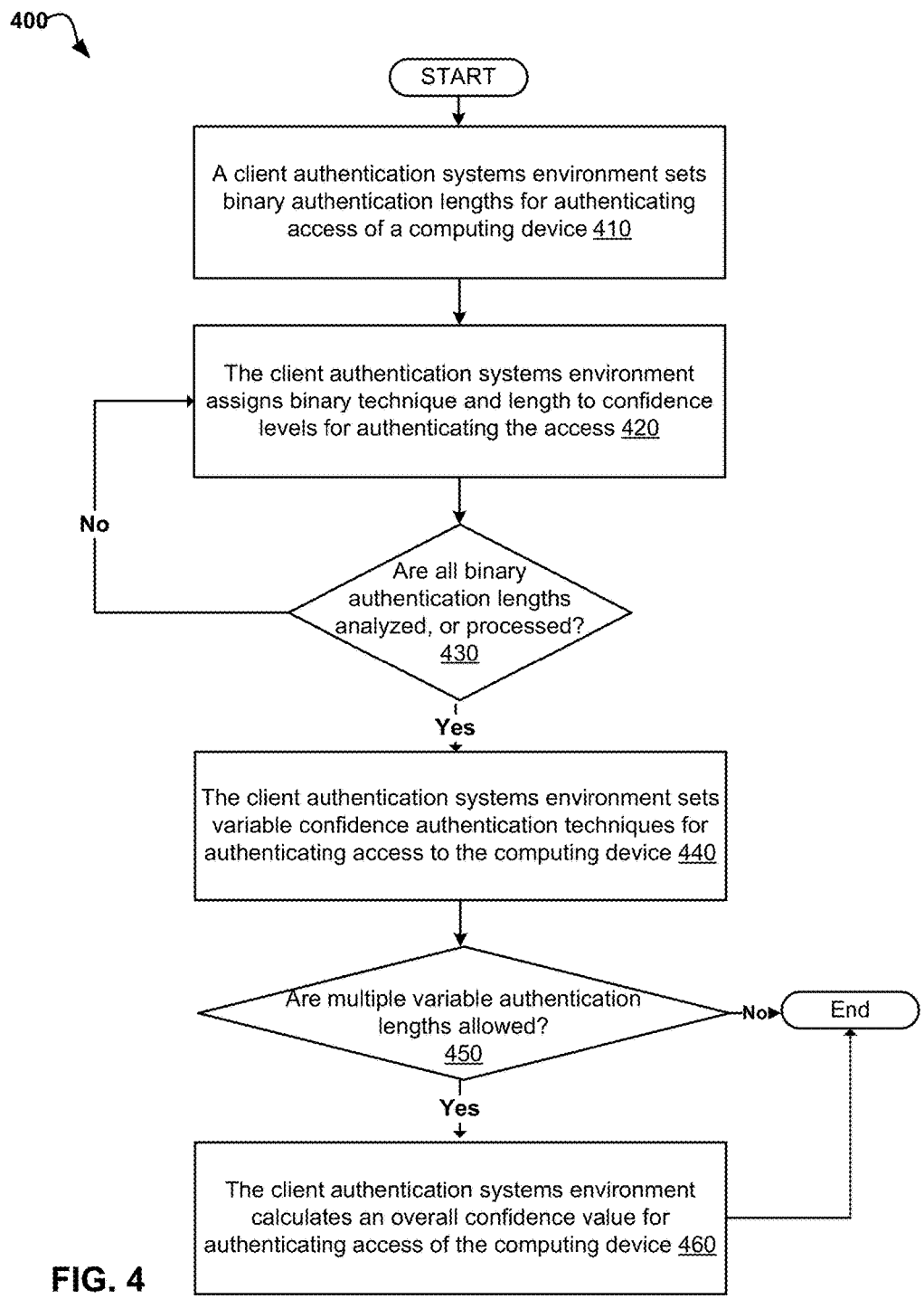
FIG. 4 is an alternative operational flowchart illustrating steps carried out by a program for authenticating access of a computing device, according to at least one embodiment.

Referring now to FIG. 4, an operational flowchart 400 illustrating steps carried out by a program receiving binary authentication data of a binary authentication input data program of the client authentication systems environment 114A (FIG. 1), for biometric variable verification data of a variable authentication input program of the client authentication systems environment 114A (FIG. 1), for accessing the computing device 102 (FIG. 1), according to embodiments. At step 410, a client authentication systems environment 114A sets, or configures binary authentication lengths for authentication access to the computing device 102 (FIG. 1), whereby a client or a system is authenticated to access the computing device 102 (FIG. 1), and also, whereby, the binary authentication lengths may be configured by the client or the system, via the client authentication systems environment 114A (FIG. 1), for accessing the computing device 102 (FIG. 1). For example, at step 420, the client may assign authenticating passwords lengths, such as, for instance, one or more characters of passwords for authenticating access to the computing device 102 (FIG. 1), whereby the assigned authenticating password lengths are aligned with binary authenticating techniques and authenticating confidence levels, of the client, or the system, for accessing the computing device 102 (FIG. 1).

Next, at decision 430, it is determined, by the client authentication systems environment 114A, whether all binary authentication lengths are analyzed, or processed, for authenticating access to the computing device 102 (FIG. 1). For example, if all of the binary authenticating methods are analyzed, or processed, for accessing the computing device 102, then, at step 440, the client authentication systems environment 114A sets variable confidence authentication techniques for authenticating access to the computing device, based on received biometric variable verification data of a client, or a system, of a variable authentication input program, of the client authentication systems environment 114A (FIG. 1), for accessing the computing device 102 (FIG. 1). However, if all of the binary authenticating methods have not been analyzed, or processed, then at step 420, client authentication systems environment 114A determines whether all binary authentication lengths are analyzed, or processed, for authenticating access to the computing device 102 (FIG. 1).

Further, at decision 450, client authentication systems environment 114A determines whether multiple variable authentication lengths are allowed, or permitted, for authenticating the client or the system, based on variable authentication methods for accessing computing device 102 (FIG. 1). For example, for each, or all of the variable authentication techniques, for authenticating the client or the system of computing device 102, such as, fingerprint reader, facial recognition, iris scan, characteristics of finger touch, typematic cadence, the client authentication systems environment 114A determine their confidence values of each of the authentication techniques. As such, if multiple variable authentication techniques are to be used, then the client authentication systems environment 114A determines a confidence weight of the variable authentication techniques, which is utilized for accessing the computing device 102, whereby the variable authentication technique is based on an average weighted score, least weighted score, or a most weighted score, which are utilized to determine an overall_confidence_value, representative of confirmation of the variable authentication technique, for accessing the computing device 102. For example, if the system has both a fingerprint reader data and voice recognition authentication reader data, the client authentication systems environment 114A combines the data reader into a single overall_confidence_value, for authenticating the access of the client or the system according to embodiments. If it is determined, at decision 450 that multiple binary authentication lengths are allowed or permitted, then at step 460, the client authentication systems environment 114A calculates an overall confidence value for authenticating access of the computing device, whereby, the calculated confidence value score is utilized to determine variable authentication techniques, or methods for authenticating the computing device 102, according to embodiments.

Figure 5:
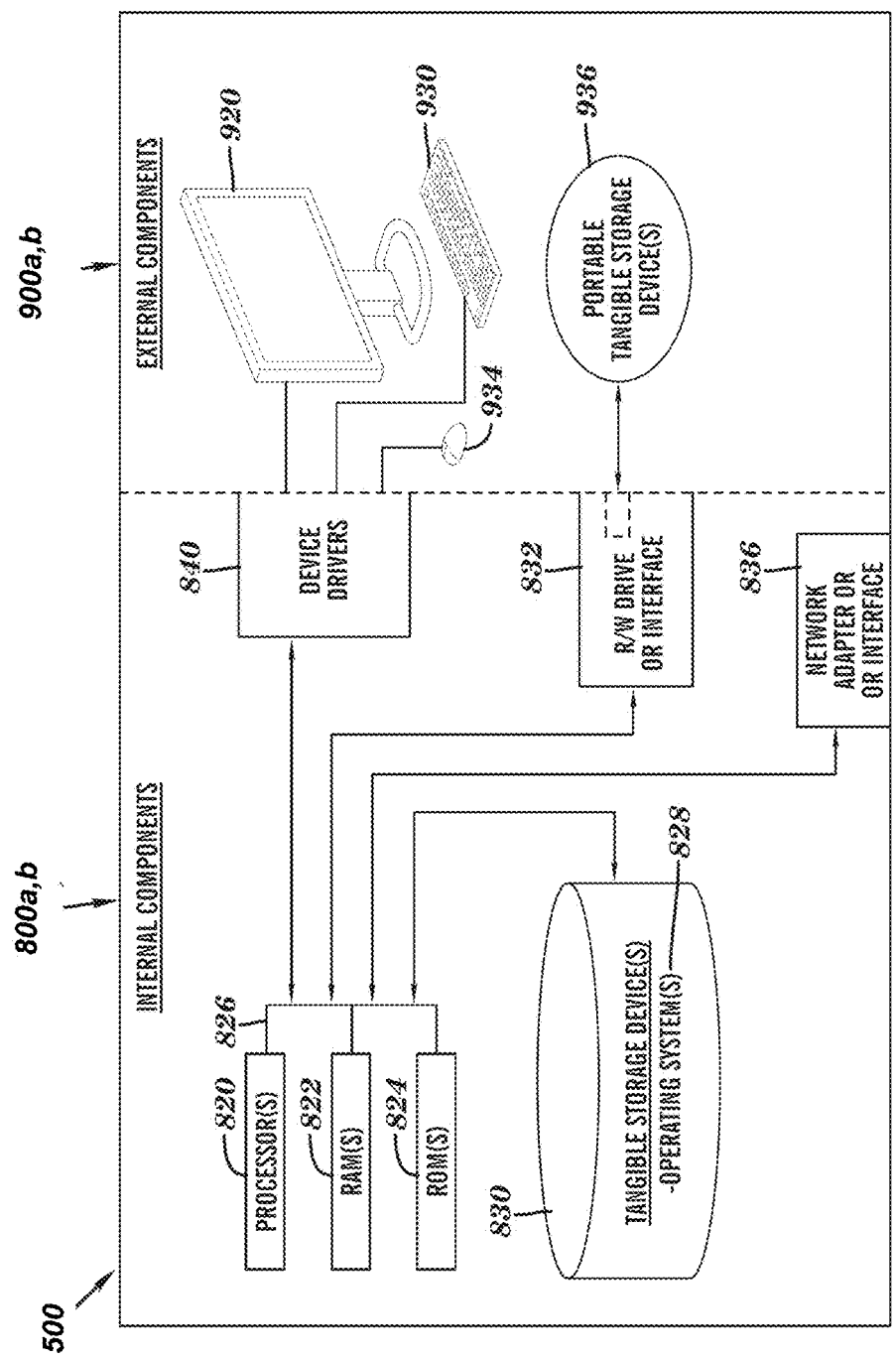
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client authentication systems environment 114A (FIG. 1), and server integrated environment 114B (FIG. 1) may include respective sets of internal components 800a, b and external components 900a, b illustrated in FIG. 5. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830.

The one or more operating systems 828 and software programs 108 (FIG. 1) in computing device 102 (FIG. 1) is stored on one or more of the respective computer-readable tangible storage medium 830 for execution by one or more of the respective processors 820 via one or more of the respective RAMs 822 (which typically include cache memory). In the embodiment illustrated in FIG. 5, each of the computer-readable tangible storage medium 830 is a magnetic disk storage device of an internal hard drive.

Alternatively, each of the computer-readable tangible storage medium 830 is a semiconductor storage device such as ROM 824, EPROM, flash memory or any other computer-readable tangible storage device that can store a computer program and digital information. Each set of internal components 800a, b also includes a R/W drive or interface 832 to read from and write to one or more portable computer-readable tangible storage medium 936 such as a CD-ROM, DVD, memory stick, magnetic tape, magnetic disk, optical disk or semiconductor storage device. A software program 108 (FIG. 1), such as, the client authentication systems environment 114A (FIG. 1) can be stored on one or more of the respective portable computer-readable tangible storage medium 936, read via the respective R/W drive or interface 832 and loaded into the respective hard drive 830. Each set of internal components 800a, b also includes network adapters or interfaces 836 such as a TCP/IP adapter cards, wireless Wi-Fi interface cards, or 3G or 4G wireless interface cards or other wired or wireless communication links.

The software program 108 (FIG. 1) and the client authentication systems environment 114A (FIG. 1) in computing device 102 (FIG. 1) and server integrated environment 114B (FIG. 1) can be downloaded to computing device 102 (FIG. 1) and server 112 (FIG. 1), respectively from an external computer via a network (for example, the Internet, a local area network or other, wide area network) and respective network adapters or interfaces 836. From the network adapters or interfaces 836, the code software programs 108 (FIG. 1) and client authentication systems environment 114A (FIG. 1) in computing device 102 (FIG. 1) and integrated server environment 114B in server 112 (FIG. 1) are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824). The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for authenticating a device, the computer-implemented method comprising:
  receiving a first stage biometric variable verification data for accessing the device, wherein the received first stage biometric variable verification data is detected by biometric sensors of the device, and wherein the first stage biometric variable verification data is based on biometric verification techniques, including one or more of finger press strength techniques, voice recognition techniques, face recognition techniques, or hand print techniques;
  computing a requirement for a second stage binary authentication data for accessing the device, based on the received first stage biometric variable verification data;
  analyzing the received first stage biometric variable verification data and the second stage binary authentication data, to determine whether the first stage biometric variable verification data and the second stage binary authentication data are associated with a client or a system attempting to access the device, wherein the client or the system is identified and authenticated based on percentage levels of detection of the biometric verification techniques; and
  generating a confidence score level when the client or the system associated with the first stage biometric variable verification data and the second stage binary authentication data, wherein the confidence score level is based on the first stage biometric variable verification data and multiple variable authentication lengths of the one or more finger press strength techniques, voice recognition techniques, face recognition techniques, or hand print techniques, wherein when the first stage biometric variable verification data is verified as having a sufficient confidence score, then a required password entry, for the second stage binary authentication data, requires a length of characters less than a full length of characters and greater than zero characters for accessing the device, wherein the required length of characters of the password entry is variable based on the generated confidence score level.

2. The computer-implemented method of claim 1, wherein if first stage biometric variable verification data is verified as having a sufficient confidence level score, the device overlooks an error in entry of a plurality of characters of passwords, or pass-pins, of the received second stage binary authentication data.

3. The computer-implemented method of claim 1, wherein the detected first stage biometric variable verification data comprises a plurality of biometric verification techniques.

4. The computer-implemented method of claim 1, wherein an overall confidence score level is generated for each one of the plurality biometric verification techniques.

5. The computer-implemented method of claim 1, wherein the first stage biometric variable verification data is detected by at least one or more of biometric sensors comprises a plurality of surveillance systems, fingerprint readers, or touch screen detector devices, of the device.

6. The computer-implemented method of claim 5, wherein the first stage biometric variable verification data is a biometric security access mechanism, for accessing the device, by the client or the system.

7. The computer-implemented method of claim 1, wherein the second stage binary authentication data is a binary security access mechanism, for accessing the device, by the client or the system.

8. A computer system for authenticating a device, the computer system comprising:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
program instructions to receive a first stage biometric variable verification data for accessing the device, wherein the received first stage biometric variable verification data is detected by biometric sensors of the device, and wherein the first stage biometric variable verification data is based on biometric verification techniques, including one or more of finger press strength techniques, voice recognition techniques, face recognition techniques, or hand print techniques:
program instructions to compute a requirement for a second stage binary authentication data for accessing the device, based on the received first stage biometric variable verification data;
program instructions to analyze the received first stage biometric variable verification data and the second stage binary authentication data, to determine whether the first stage biometric variable verification data and the second stage binary authentication data are associated with a client or a system attempting to access the device, wherein the client or the system is identified and authenticated based on percentage levels of detection of the biometric verification techniques; and
program instructions to generate a confidence score level when the client or the system associated with the first stage biometric variable verification data and the second stage binary authentication data, wherein the confidence score level is based on the first stage biometric variable verification data and multiple variable authentication lengths of the one or more finger press strength techniques, voice recognition techniques, face recognition techniques, or hand print techniques, wherein when the first stage biometric variable verification data is verified as having a sufficient confidence score, then a required password entry, for the second stage binary authentication data, requires a length of characters less than a full length of characters and greater than zero characters for accessing the device, wherein the required length of characters of the password entry is variable based on the generated confidence score level.

9. The computer system of claim 8, wherein if first stage biometric variable verification data is verified as having a sufficient confidence level score, the device overlooks an error in entry of a plurality of characters of passwords, or pass-pins, of the received second stage binary authentication data.

10. The computer system of claim 8, wherein the detected first stage biometric variable verification data comprises a plurality of biometric verification techniques.

11. The computer system of claim 10, wherein an overall confidence score level is generated for each one of the plurality biometric verification techniques.

12. The computer system of claim 8, wherein the first stage biometric variable verification data is detected by at least one or more of biometric sensors comprises a plurality of surveillance systems, fingerprint readers, or touch screen detector devices, of the device.

13. The computer system of claim 12, wherein the second stage biometric variable verification data is a biometric security access mechanism, for accessing the device, by the client or the system.

14. The computer system of claim 8, wherein the first stage biometric variable verification data is a biometric security access mechanism, for accessing the device, by the client or the system.

15. A computer program product for authenticating a device, the computer program product comprising:
one or more computer-readable tangible storage devices and program instructions stored on at least one of the one or more storage devices, the program instructions comprising:
program instructions to receive a first stage biometric variable verification data for accessing the device, wherein the received first stage biometric variable verification data is detected by biometric sensors of the device, and wherein the first stage biometric variable verification data is based on biometric verification techniques, including one or more of finger press strength techniques, voice recognition techniques, face recognition techniques, or hand print techniques:
program instructions to compute a requirement for a second stage binary authentication data for accessing the device, based on the received first stage biometric variable verification data;
program instructions to analyze the received first stage biometric variable verification data and the second stage binary authentication data, to determine whether the first stage biometric variable verification data and the second stage binary authentication data are associated with a client or a system attempting to access the device, wherein the client or the system is identified and authenticated based on percentage levels of detection of the biometric verification techniques; and
program instructions to generate a confidence score level when the client or the system associated with the first stage biometric variable verification data and the second stage binary authentication data, wherein the confidence score level is based on the first stage biometric variable verification data and multiple variable authentication lengths of the one or more finger press strength techniques, voice recognition techniques, face recognition techniques, or hand print techniques, wherein when the first stage biometric variable verification data is verified as having a sufficient confidence score, then a required password entry, for the second stage binary authentication data, requires a length of characters less than a full length of characters and greater than zero characters for accessing the device, wherein the required length of characters of the password entry is variable based on the generated confidence score level.

16. The computer program product of claim 15, wherein if first stage biometric variable verification data is verified as having a sufficient confidence level score, the device overlooks an error in entry of a plurality of characters of passwords, or pass-pins, of the received second stage binary authentication data.

17. The computer program product of claim 15, wherein the detected first stage biometric variable verification data comprises a plurality of biometric verification techniques.

18. The computer program product of claim 17, wherein an overall confidence score level is generated for each one of the plurality biometric verification techniques.

19. The computer program product of claim 15, wherein the first stage biometric variable verification data is detected by at least one or more of biometric sensors comprises a plurality of surveillance systems, fingerprint readers, or touch screen detector devices, of the device.

20. The computer program product of claim 15, wherein the second stage biometric variable verification data is a biometric security access mechanism, for accessing the device, by the client or the system.

* * * * *